United States Patent [19]
Lin

[11] Patent Number: 5,434,372
[45] Date of Patent: Jul. 18, 1995

[54] POSITION DETECTING APPARATUS WITH COILS OF OPPOSITE LOOP DIRECTION

[75] Inventor: Chyi-Cheng Lin, Taipei, Taiwan

[73] Assignee: Acer Peripherals, Inc., Taiwan

[21] Appl. No.: 109,656

[22] Filed: Aug. 19, 1993

[51] Int. Cl.$^6$ ............................................. G08C 21/00
[52] U.S. Cl. ................................................... 178/19
[58] Field of Search ..................... 172/18, 19; 345/156, 345/157; 341/5; 364/709.11, 709.1

[56] References Cited

U.S. PATENT DOCUMENTS

| | | | |
|---|---|---|---|
| 4,734,546 | 3/1988 | Landmeier | 178/19 |
| 4,878,553 | 11/1989 | Yamanami et al. | 178/18 |
| 4,999,461 | 3/1991 | Murakami et al. | 178/19 |
| 5,051,545 | 9/1991 | McDermott | 178/19 |
| 5,276,282 | 1/1994 | Russell | 178/19 |

*Primary Examiner*—Stephen Chin
*Assistant Examiner*—Paul Loomis
*Attorney, Agent, or Firm*—Townsend and Townsend Khourie and Crew

[57] ABSTRACT

A position detecting apparatus includes a tablet and a position pointer. The tablet includes a plurality of electromagnetic wave generating/detecting apparatus. The generating/detecting apparatus generates an electromagnetic wave at specified points of time and detects electromagnetic wave at different points of time. The electromagnetic wave generating/detecting apparatus includes a first coil of a first direction with a first inductance value and a second coil of a second direction with a second inductance value. The first and second coils are coupled serially and closely adjacent to each other and the first inductance value is substantially equal to the second inductance value. Only the first coil is enabled when the electromagnetic wave generating/detecting apparatus is generating the electromagnetic wave, the first and second coils are both enabled when the electromagnetic wave generating/detecting apparatus is receiving the electromagnetic wave. Any interference sensed both by the first and second coils are offset and therefore a position detecting apparatus with high immunity from the electromagnetic interference is provided.

24 Claims, 5 Drawing Sheets

POSITION DETECTING APPARATUS WITH COILS OF OPPOSITE LOOP DIRECTION

BACKGROUND OF THE INVENTION

This invention relates to a position detecting apparatus and, in particular, to the arrangement of loop coils of the position detecting apparatus.

An electromagnetic tablet together with a wireless position pointer has been known to be an effective input device to a computer system. The position pointer, in general, has a tuning circuit which resonates with a first electromagnetic wave from the electromagnetic tablet to generate a second electromagnetic wave. The tuning circuit typically has a LC circuit. The electromagnetic tablet has a plurality of electromagnetic wave generating and detecting coils. When a signal with a specified frequency is generated by a generating coil, current and voltage are induced within the tuning circuit of the position pointer. At this moment, the wave generating coil is disabled and the second electromagnetic wave is generated from the LC tuning circuit due to the electromagnetic effect of the induced current and voltage.

The second electromagnetic wave is detected by a detecting coil of the electromagnetic tablet and therefore a current and voltage are induced within the detecting coil. The induced voltage on the detecting coil is a function of the distance between the position pointer and the detecting coil. The plurality of generating coils are sequentially supplied with electric current to generate the first electromagnetic wave and the plurality of detecting coils are sequentially detected so that the position pointed by the position pointer is identified by the position of the detecting loop coil in which the highest voltage is induced.

The above describes the basic principle of the wireless position detecting apparatus. An in-depth description of such apparatus is set forth in U.S. Pat. No. 4,878,553, the disclosure of which is incorporated by reference.

The principle involved in the electromagnetic wave transmission of the position detecting apparatus mentioned above is the electromagnetic effect. As a result, when there exists any interference magnetic field within the vicinity of the detecting coils, malfunction of the position detecting can easily occur. For a less serious malfunction, accuracy of the position detecting apparatus is sacrificed. For a more serious malfunction, the position of the position pointer may not even be detected. Since the power source of the wireless position pointer is a battery or a passive type source, the output power is so low that its accuracy is easily influenced by the interference magnetic field.

There are two kinds of coil arrangement according to the conventional art. The first one may be called a single-direction looped coil arrangement as shown in FIG. 1 and the second one may be called a bi-direction looped coil arrangement as shown in FIG. 2. The figures show coils for position detection along a single axis. The tablet would normally also include a set of coils and associated circuitry for position detection along a perpendicular axis.

In FIG. 1, the position detecting apparatus consists of a plurality of coils L1, L2, ..., each of which loops in a clockwise direction and defines an area and an inductance value. The area defined by each coil, in most cases, overlaps each other as shown to minimize the overall size of the electromagnetic tablet. One end terminal of each coil is coupled to the ground and the other end is respectively coupled to a transmission circuit 11 and a receiving circuit 12 through a first switch device SW1 and a second switch device SW2.

The operation of the apparatus shown in FIG. 1 is as follows. At first, first switch SW1 is switched to the A1 terminal and second switch SW2 is switched to the B0 terminal. At this time, transmission circuit 11 supplies a current to first coil L1 which generates an electromagnetic wave to the position pointer 13. After a later time on which the LC circuit in position pointer 13 generates a current and voltage, first switch SW1 is switched to the A0 terminal and the second switch SW2 is switched to B1, and first coil L1 acts as detecting loop coil at this moment. The electromagnetic wave generated from position pointer 13 is then detected by first coil L1 and through second switch SW2 the induced current and voltage is then received by receiving circuit 12. Through the switching of the terminals A0, A1, ... and B0, B1, ..., the highest voltage induced may be found and the position pointed by pointer 13 may be determined.

One of the drawbacks of the above mentioned coil arrangement is the vulnerability to electromagnetic noise. One may only screen the noise by a filter after the induced signal is amplified by the receiving circuit 12, but this will definitely affect the true signal and degrade the accurate position measurement.

In FIG. 2, the position detecting apparatus consists of a plurality of coil assemblies L1, L2, ... However, each coil assembly has two coils with oppositely looped direction. For example, coil assembly L1 has one clockwise looped coil L1F and one counterclockwise looped coil L1R. Coil L1F is spaced apart from coil L1R by an amount of W/2, where W is the overall width of the electromagnetic tablet. The dashed line 20 is the center line of the tablet. The function block 21 has the same function as the transmission and receiving circuit 14 of FIG. 1.

The operation of the position detecting apparatus of FIG. 2 is generally the same as that of the apparatus of FIG. 1. However, since coils L1F and L1R are used together to generate the electromagnetic wave to the position pointer 23, in order to accurately determine the position pointed, a polarity determination has to be made for the effect of the counterclockwise coil L1R. That is, the use of the second coil introduces an ambiguity since the determination of the highest voltage does not distinguish which of the two coils is closest to the pointer. The polarity of the detected signal must be determined to resolve this ambiguity.

The bi-direction looped coil as shown in FIG. 2 is more immune to noise than the coil arrangement shown in FIG. 1. As long as the interference source is not concentrated in the area of the coil pointed by the pointer 23, the interfering effect imposed upon the clockwise coil will be offset by the interfering effect imposed upon the counterclockwise coil. As a result, interference is minimized. However, since the clockwise and counterclockwise coil are spaced by w/2, if the interference source is concentrated on the vicinity of the pointer 23, a substantial interference is felt. Thus, coil arrangement of FIG. 2 is effective to immunize from the noise only when the noise is distributed evenly over the entire area of the tablet or the interfering source is distant from the tablet.

SUMMARY OF THE INVENTION

The present invention provides a position detecting apparatus having a high immunity to electromagnetic interference.

The position detecting apparatus includes a tablet and a position pointer. The tablet includes a plurality of electromagnetic wave generating/detecting coil assemblies, each of which is used to generate an electric wave at different time points. Each electromagnetic wave generating/detecting assembly includes a first coil of a first, loop direction with a first inductance value and one or more additional coils of a second loop direction with a second total inductance value. The first and additional coils are coupled serially and closely adjacent to each other and the first inductance value is substantially equal to the second inductance value.

Only the first coil is enabled when the electromagnetic wave is being generated; the first and additional coils are enabled when the electromagnetic wave is being received. Any interference sensed both by the first and additional loop coils are offset and therefore a position detecting apparatus with high immunity from the electromagnetic interference is provided. No polarity determination is required.

The characteristic and benefit of the invention may be further understood by the following detailed descriptions and drawings.

DESCRIPTION OF THE SPECIFIC EMBODIMENTS

Figure 3:
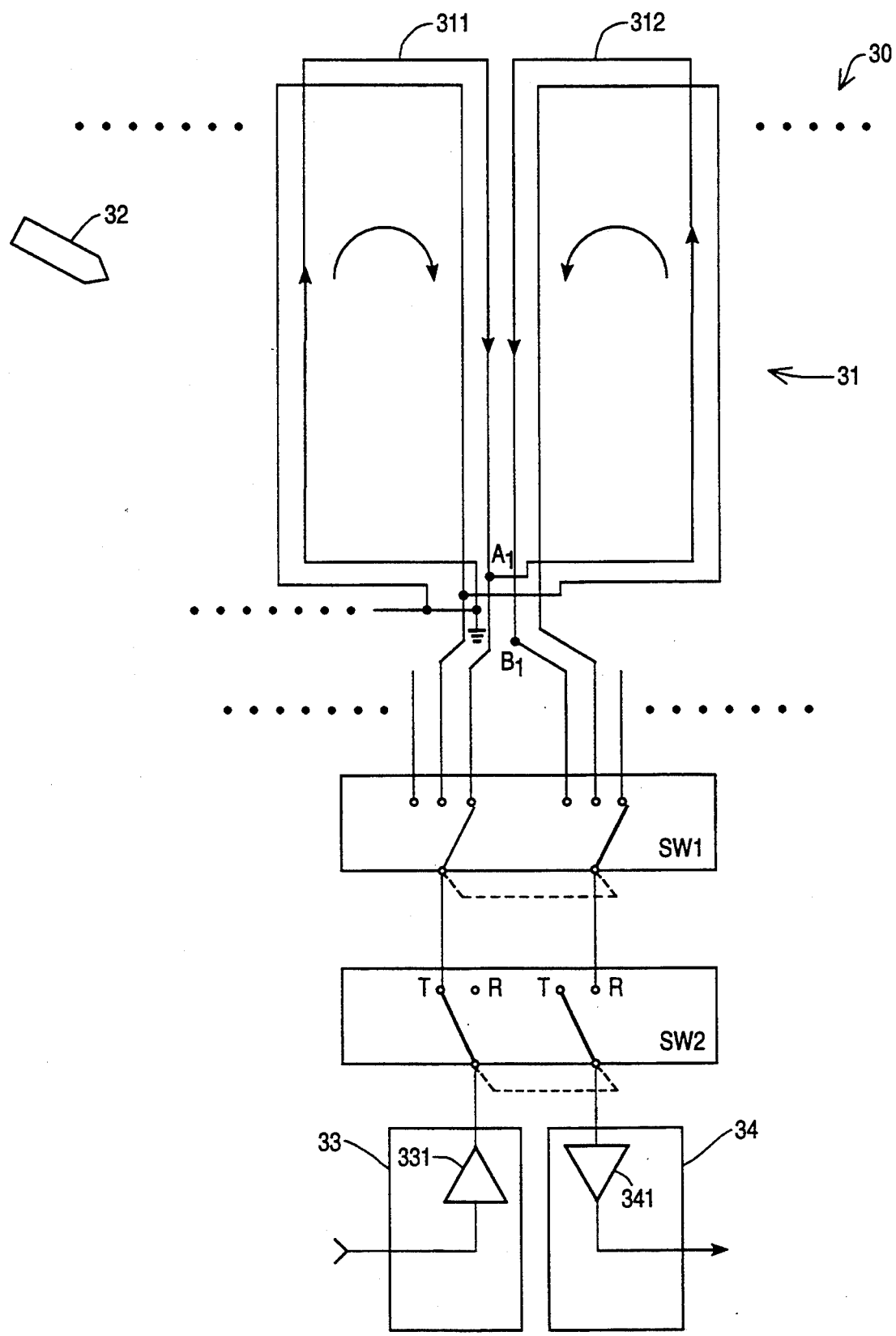
FIG. 3 is shows one embodiment of position detecting apparatus according to the invention.

According to one embodiment, disclosed in FIG. 3, the position detecting apparatus includes an electromagnetic tablet 30 and a position pointer 32. While the pointer is shown as a pen-like device, the pointer could also be a puck-like device with a cursor, which the user pushes along the tablet surface. The electromagnetic tablet 30 includes a plurality of electromagnetic wave generating/detecting coil assemblies 31. Two such assemblies are shown. Each coil assembly 31 functions as device of wave generation at specified time points and as device of wave detection at different specified time points. The position pointer 32, as being known to the persons skilled in art, includes a tuning circuit. The tuning circuit resonates and generates a reflective electromagnetic wave in response to an incoming electromagnetic wave from the electromagnetic tablet 30. The detecting coil 31 detects the reflective wave and therefore induces a voltage and current within the detecting coil.

One of generating/detecting coil assemblies 31 includes a first coil 311 of a first loop direction with a first inductance value and a second coil 312 of a second loop direction, opposite the first loop direction, with a second inductance value. The first and second loop coils are coupled serially and closely adjacent to each other, and the first inductance value is substantially equal to the second inductance value. When a particular electromagnetic wave generating/detecting coil assembly 31 is generating the first electromagnetic wave, only first coil 311 is enabled. When the electromagnetic wave generating/detecting coil assembly is receiving the second electromagnetic wave, first and second coils 311 and 312 are both enabled.

As shown in FIG. 3, first coil 311 has a terminal coupled to a reference ground and is coupled to second coil 312 at a node point A1. Node point A1 is selectively coupled to a transmission circuit 33 through a first selection device SW1 and a second selection device SW2 when tablet 30 is generating the first electromagnetic wave. Terminal A1 is decoupled from the transmission circuit 33 through the second selection device SW2 when tablet 30 is in the period of detecting the electromagnetic wave. Transmission circuit 33 at least includes an oscillator 331.

Second coil 312 has a second terminal B1, which is selectively coupled to a receiving circuit 34 through second selection device SW2 and first selection device SW1 when the tablet 30 is detecting the second electromagnetic wave. The second terminal B1 is decoupled from the receiving circuit 34 through second selection device SW2 when the tablet 30 is transmitting the first electromagnetic wave. Receiving circuit 34 at least includes an amplifier 341.

Figure 1:
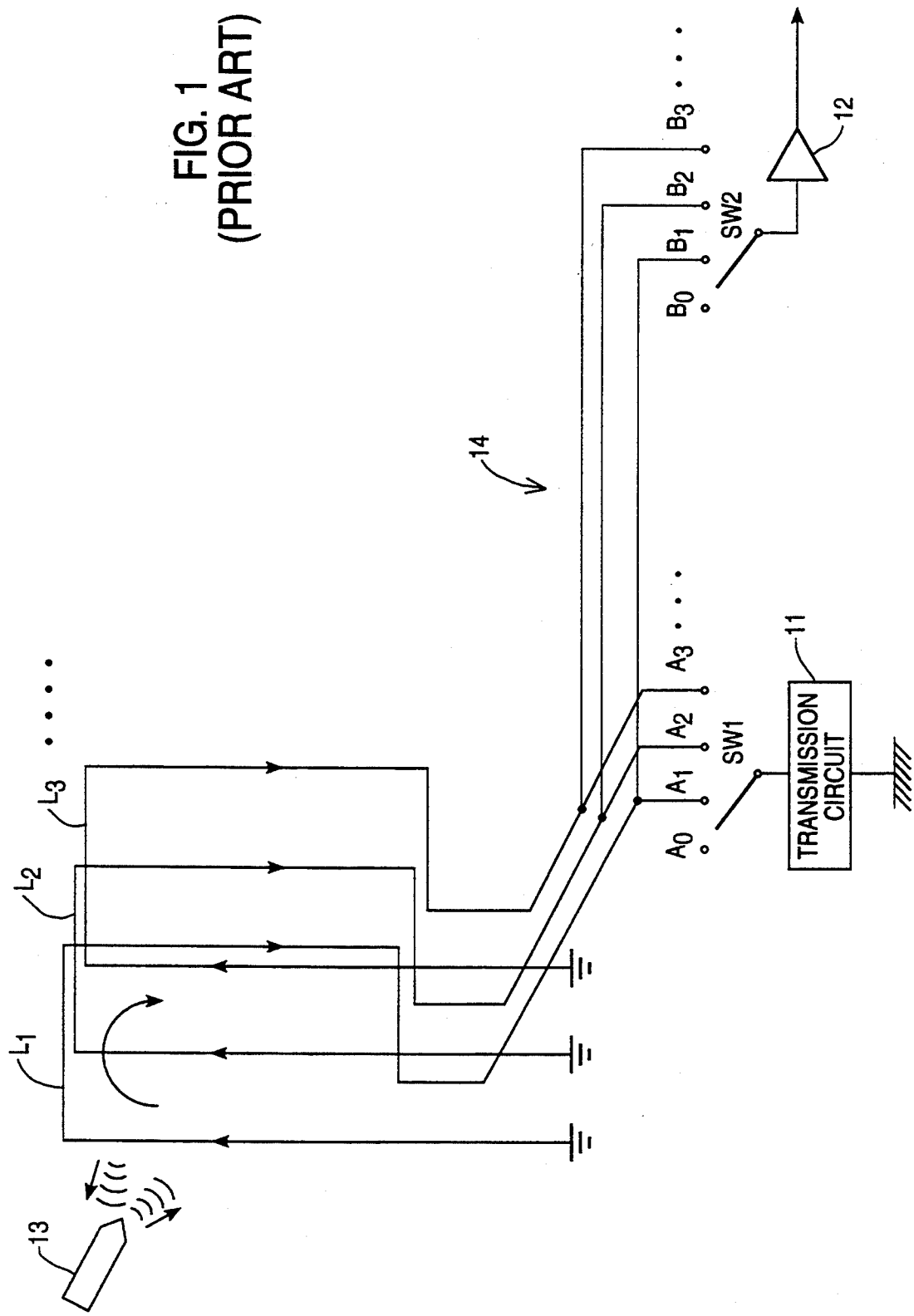
FIG. 1 shows a prior art single direction position detecting apparatus using looped coils.
Figure 2:
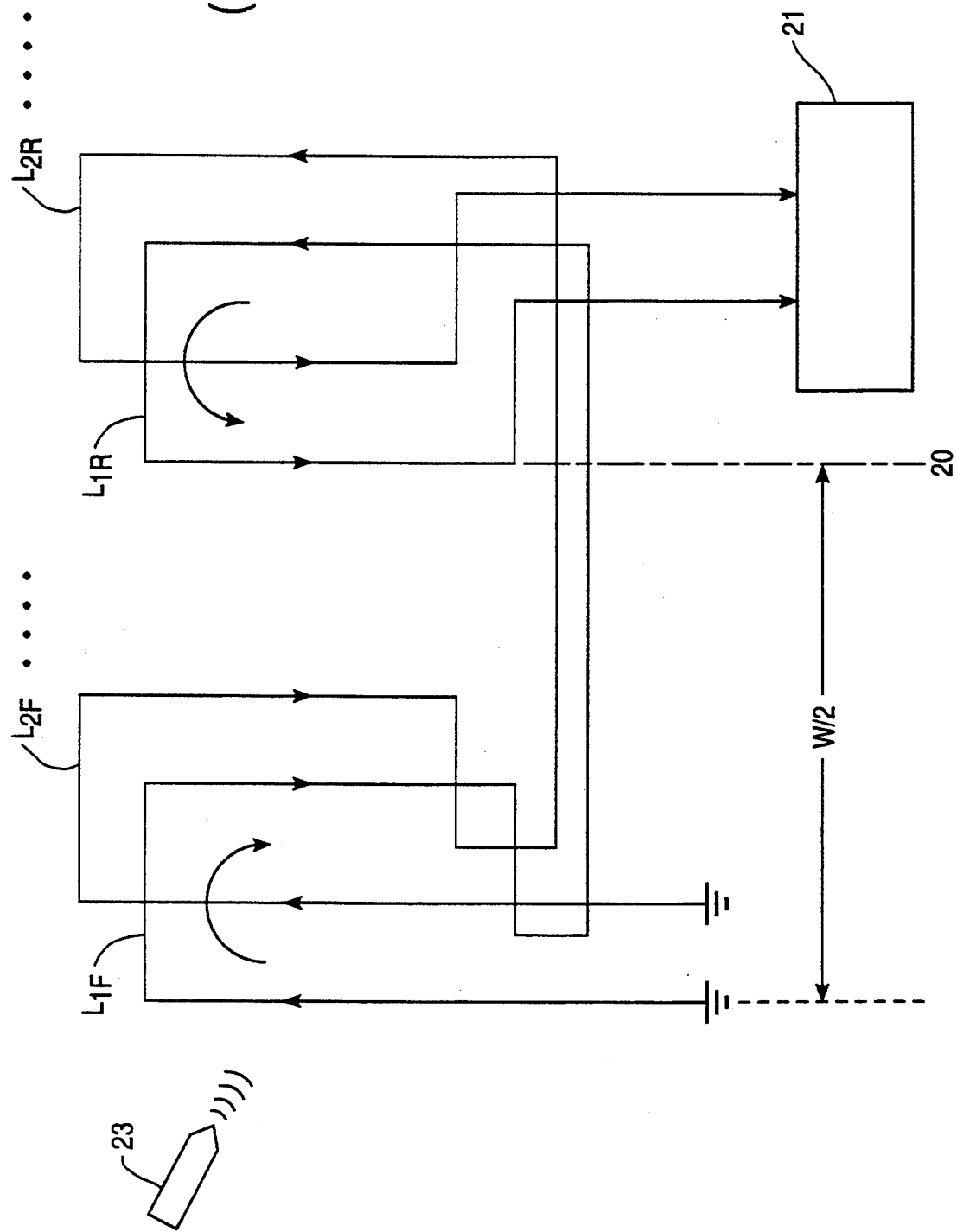
FIG. 2 shows a prior art bi-direction position detecting apparatus using looped coils.

Since second coil 312 is disabled during the wave transmitting period, there will not be two incoming reflective electromagnetic waves while tablet 30 is in the wave detecting period. As a result, the polarity determination needed for the arrangement of FIG. 2 is no longer required for the arrangement of FIG. 3.

Since first coil 311 and second coil 312 are serially coupled to receive the electromagnetic wave when tablet 30 is in the wave detecting period, any interference sensed both by the first and second coils are counterbalanced. The true reflective wave is then sensed and input to receiving circuit 34 according to the present invention.

Figure 4:
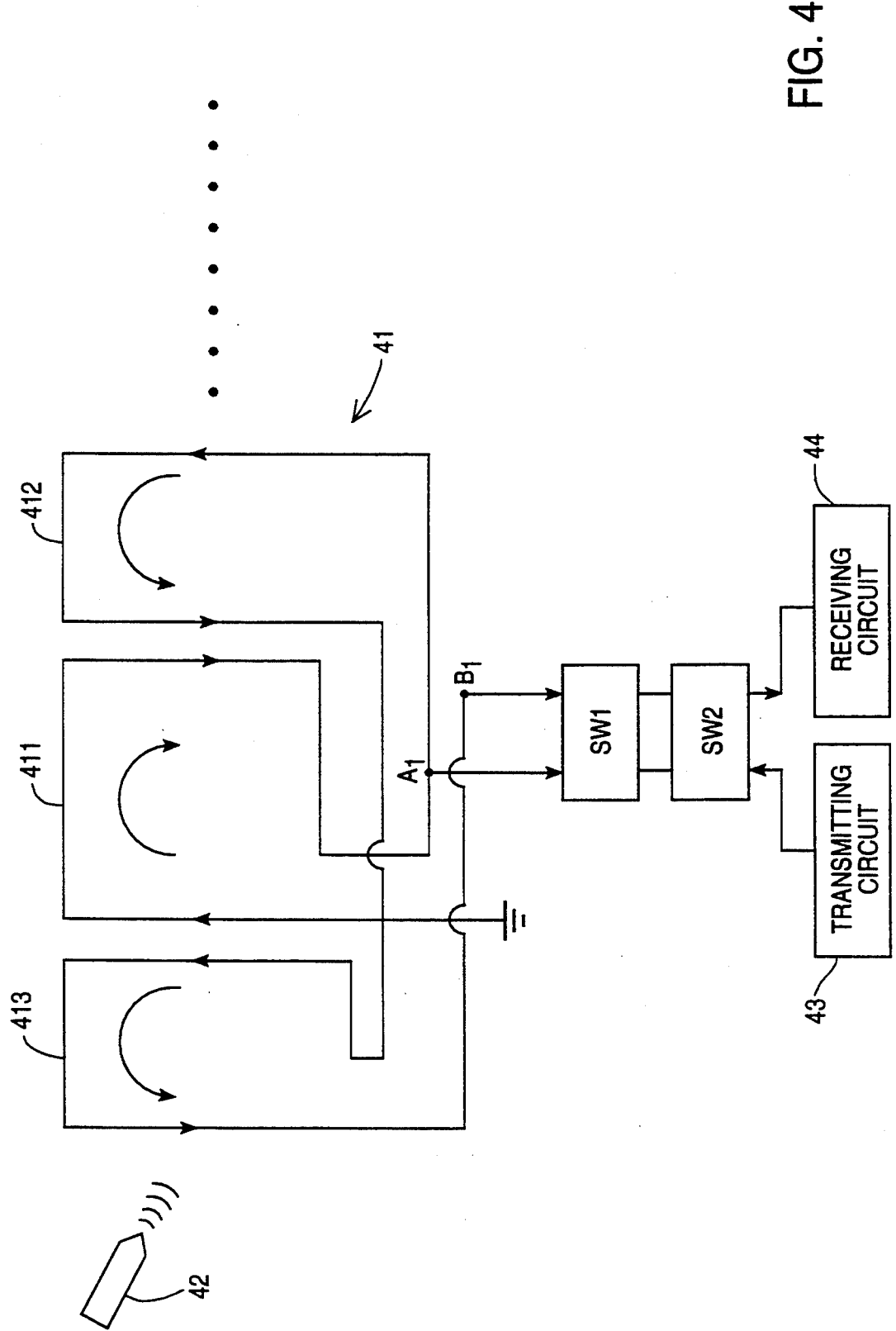
FIG. 4 shows another embodiment of position detecting apparatus according to the invention.

The basic principle underlying a second embodiment of the invention, as shown in FIG. 4, and the detailed description of the arrangement thereof may be referred to those of the first embodiment of the invention, as shown in FIG. 3. The embodiments of FIG. 3 and FIG. 4 differ as follows.

An electromagnetic wave generating/detecting coil assembly 41 includes a first coil 411 of a first direction with a first inductance value and second and third coils 412 and 413 of a second direction with second and third inductance values, respectively. The first, second, and third coils are serially coupled to each other, and the second and third coils are arranged closely adjacent to first coil 411, on the opposite sides of the first coil. The first inductance value is substantially equal to the sum of second and third inductance values. Only first coil 411 is enabled when electromagnetic wave generating/detecting coil assembly 41 is used for generating the first electromagnetic wave. All three coils are enabled when electromagnetic wave generating/detecting coil assembly 41 is receiving the second electromagnetic wave.

The operation of connection/disconnection of the nodes of coils 411, 412, and 413 to the transmitting circuit 43 and the receiving circuit 44 of FIG. 4 are the same as those of FIG. 3. Since there are second and third coils of the second direction on the opposite sides of first coil 411, even an interference source within close proximity of either sides of first loop coil 411 may be counterbalanced substantially.

Figure 5:
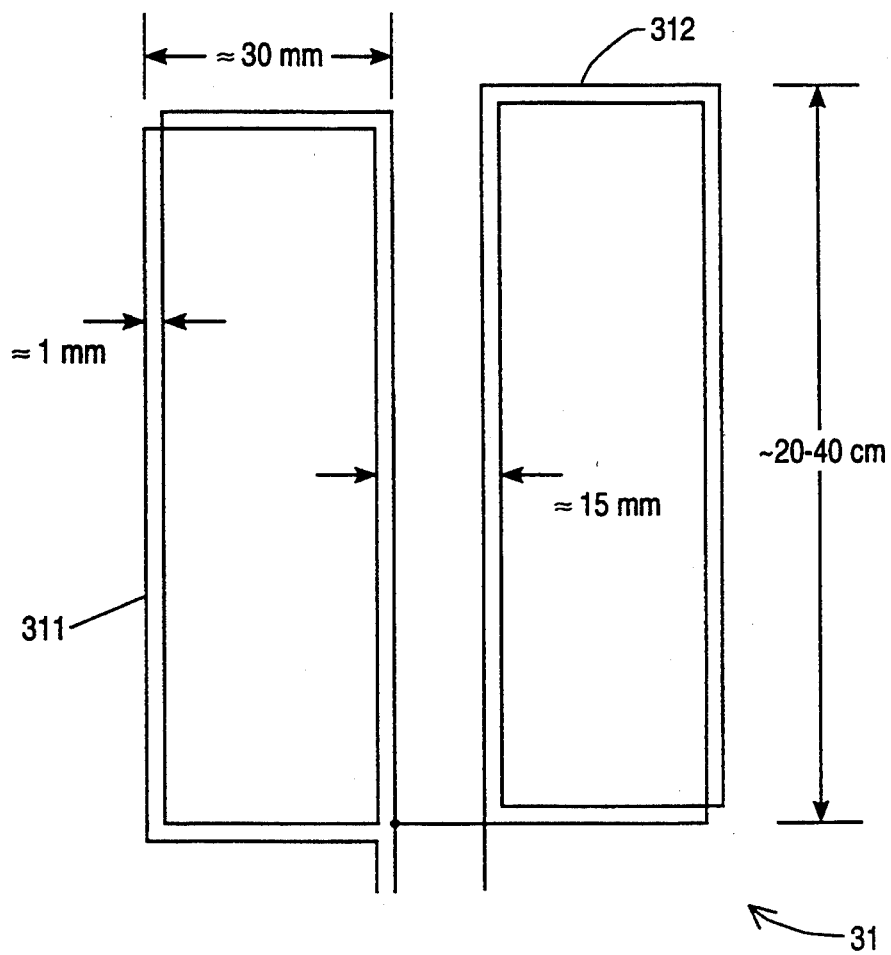
FIG. 5 shows representative dimensions for the coil assemblies of FIG. 3.

FIG. 5 shows a particular implementation, including representative dimensions, for one of coil assemblies 31 (coils 311 and 312) of the embodiment of FIG. 3. As can be seen, each of coils 311 and 312 includes two loops for increased sensitivity (in FIG. 3, each coil was shown with a single turn for simplicity).

Although specific coil dimensions are not fundamental to the invention, the coils are shown as having a width of approximately 30 mm with an offset between turns of approximately 1 mm. The coil height depends on the size of the tablet, with 20–40 cm being typical.

The spacing between coils 311 and 312 is shown as approximately 15 mm. Given the configuration where only the first coil is enabled during wave generation, there is no need to separate the coils by half the tablet width. Thus, the noise-cancelling coil(s) can be closer to the first coil and noise immunity is improved. Where the pointer has a puck-like configuration, the operating angle is fixed, and the noise-cancelling coil(s) can be placed very close to the first coil. However, if the pointer is a pen-like device where the operating angle is likely to vary, the permissible range of angles will be limited if the coils are too close. A spacing of about one-half the loop width provides a suitable compromise between noise immunity and permissible operating angle.

Despite the relative proximity of the coils, the second coil does not cancel the reflective wave. One reason is that the reflective wave is much more localized than the noise. Another reason is that the pointer only reflects over the first coil since the second coil is disabled during generation.

The above description of the embodiments of the invention is intended as illustrative rather than inclusive, modification on the invention is likely and are still within the intended scope of protection of the invention which is defined by the following appended claims.

What is claimed is:

1. A position detecting apparatus comprising:
   a tablet having a plurality of coil assemblies;
   each coil assembly having a first coil of a first loop direction with an inductance value and a second coil of a second loop direction, opposite said first loop direction, with an inductance value substantially equal to the inductance value of the first coil, the first and second coils being coupled serially and closely adjacent to each other;
   means for driving only the first coil in each coil assembly to cause the first coil in each coil assembly to generate a first electromagnetic wave during a respective generation period;
   a position pointer having a tuning circuit, said tuning circuit resonating with the first electromagnetic wave from the first coil in each coil assembly, for generating a second electromagnetic wave; and
   means for detecting signals induced by the second electromagnetic wave in the first and second coils in series during a respective subsequent detection period for each coil assembly.

2. The position detecting apparatus of claim 1 wherein the first loop direction is clockwise and the second direction is counterclockwise.

3. The position detecting apparatus of claim 1 wherein, for at least one of said coil assemblies:
   the first coil has a first terminal coupled to a reference ground;
   the first coil is coupled to the second coil at a node point; and
   the node point is selectively coupled to said driving means to cause the first coil to generate the first electromagnetic wave.

4. The position detecting apparatus of claim 3 wherein, for at least one of said coil assemblies:
   the second coil has a second terminal; and
   the second terminal is selectively coupled to said detecting means during the respective detection period.

5. The position detecting apparatus of claim 1 wherein said driving means includes an oscillation circuit.

6. The position detecting apparatus of claim 1 wherein said detecting means includes an amplification circuit.

7. A position detecting apparatus comprising:
   a tablet having a plurality of coil assemblies;
   each coil assembly having a first coil of a first loop direction with a first inductance value, and second and third coils of a second loop direction, opposite said first loop direction, with second and third inductance values respectively, the first inductance value being substantially equal to the sum of the second and third inductance values, the first, second, and third coils being serially coupled to each other, and the second and third coils being arranged closely adjacent to and on opposite sides of the first coil;
   means for driving only the first coil in each coil assembly to cause the first coil in each coil assembly to generate a first electromagnetic wave during a respective generation period;
   a position pointer having a tuning circuit, said tuning circuit resonating with the first electromagnetic wave from the first coil in each coil assembly, for generating a second electromagnetic wave; and
   means for detecting signals induced by the second electromagnetic wave in the first, second, and third coils in series during a respective subsequent detection period for each coil assembly.

8. The position detecting apparatus of claim 7 wherein the first loop direction is clockwise and the second direction is counterclockwise.

9. The position detecting apparatus of claim 7 wherein, for at least one of said coil assemblies:
   the first coil has a first terminal coupled to a reference ground;
   the first coil is coupled to the second coil at a node point; and
   the node point is selectively coupled to said driving means to cause the first coil to generate the first electromagnetic wave.

10. The position detecting apparatus of claim 9 wherein, for at least one of said coil assemblies:
    the third coil has a second terminal; and
    the second terminal is selectively coupled to said detecting means during the respective detection period.

11. The position detecting apparatus of claim 7 wherein said driving means includes an oscillation circuit.

12. The position detecting apparatus of claim 7 wherein said detecting means includes an amplification circuit.

13. In a position detecting apparatus having a position pointer and a tablet, the position pointer having a tuning circuit resonating with a first electromagnetic wave from the tablet for generating a second electromagnetic wave, the tablet having a plurality of coil assemblies and a driving/detecting circuit that sequentially energizes each coil assembly to generate the first electromagnetic wave and detects signals induced in each coil assembly by the second electromagnetic wave, the improvement wherein:

each coil assembly includes a first coil of a first loop direction with an inductance value, and a second coil of a second loop direction, opposite said first loop direction, with an inductance value substantially equal to the inductance value of the first coil, the second coil being serially coupled to the first coil and closely adjacent to the first coil;

only the first coil of each coil assembly is enabled when each coil assembly is energized to generate the first electromagnetic wave; and both the first and second coils of each coil assembly are enabled when signals induced in each coil assembly by the second electromagnetic wave are detected.

14. The generating/detecting device of claim 13 wherein the first loop direction is clockwise and the second direction is counterclockwise.

15. The generating/detecting device of claim 13 wherein, for at least one of said coil assemblies:

the first coil has a first terminal coupled to a reference ground;

the first coil is coupled to the second coil at a node point; and the node point is selectively coupled to a transmission circuit through a first selection means to cause the first coil to generate the first electromagnetic wave.

16. The generating/detecting device of claim 15 wherein, for at least one of said coil assemblies:

the second coil has a second terminal; and the second terminal is selectively coupled to a receiving circuit through a second selection means when signals induced by the second electromagnetic wave are detected.

17. The generating/detecting device of claim 15 wherein the transmission circuit includes an oscillation circuit.

18. The generating/detecting device of claim 17 wherein the receiving circuit includes an amplification circuit.

19. In a position detecting apparatus having a position pointer and a tablet, the position pointer having a tuning circuit resonating with a first electromagnetic wave from the tablet for generating a second electromagnetic wave, the tablet having a plurality of coil assemblies and a driving/detecting circuit that sequentially energizes each coil assembly to generate the first electromagnetic wave and detects signals induced in each coil assembly by the second electromagnetic wave, the improvement wherein:

each coil assembly includes a first coil of a first loop direction with a first inductance value, and second and third coils of a second loop direction, opposite said first loop direction, with second and third inductance values, respectively, the first inductance value being substantially equal to the sum of the second and third inductance values, the first, second, and third coils being serially coupled to each other, and the second and third coils being arranged closely adjacent to and on opposite sides of the first coil;

only the first coil of each coil assembly is enabled when each coil assembly is energized to generate the first electromagnetic wave; and the first, second, and third coils are enabled when signals induced in each coil assembly by the second electromagnetic wave are detected.

20. The generating/detecting device of claim 19 wherein the first loop direction is clockwise and the second direction is counterclockwise.

21. The generating/detecting device of claim 19 wherein, for at least one of said coil assemblies:

the first coil has a first terminal coupled to a reference ground;

the first coil is coupled to the second coil at a node point; and the node point is selectively coupled to a transmission circuit through a first selection means to cause the first coil to generate the first electromagnetic wave.

22. The generating/detecting device of claim 19 wherein, for at least one of said coil assemblies:

the second coil has a second terminal; and the second terminal is selectively coupled to a receiving circuit through a second selection means when signals induced by the second electromagnetic wave are detected.

23. The generating/detecting device of claim 21 wherein the transmission circuit includes an oscillation circuit.

24. The generating/detecting device of claim 23 wherein the receiving circuit includes an amplification circuit.

* * * * *